Jan. 15, 1929.  
C. A. MORGAN  
GARDEN IMPLEMENT  
Filed July 18, 1927
1,699,154
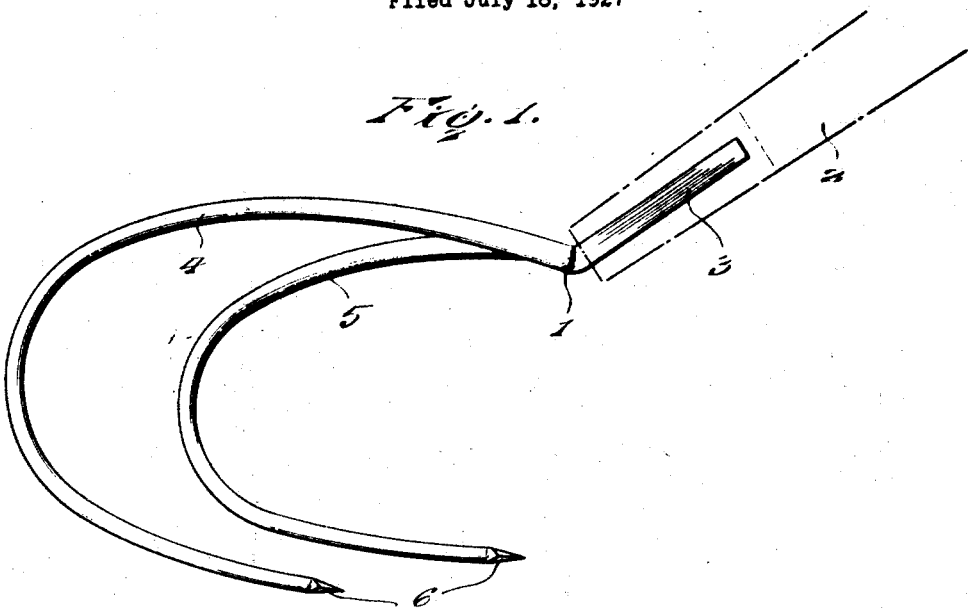
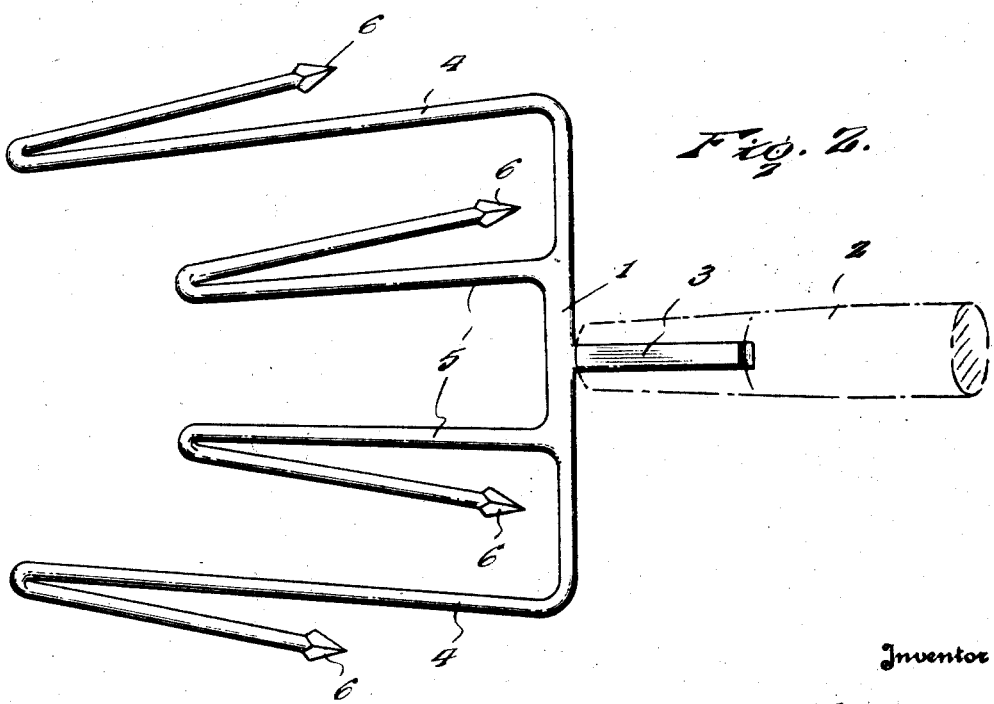
Inventor  
C. A. Morgan.  
By Lacey & Lacey, Attorneys Patented Jan. 15, 1929.

1,699,154

UNITED STATES PATENT OFFICE.

CHESTER A. MORGAN, OF SAN BERNARDINO, CALIFORNIA.

GARDEN IMPLEMENT.

Application filed July 18, 1927. Serial No. 206,592.

This invention relates to a garden implement and more particularly to a hoe by means of which ground about growing plants or between rows of plants in a garden may be broken up and reduced to fine particles.

A main object of the invention is to form the hoe with tines or prongs projecting from a cross bar and so bent that their free end portions will extend rearwardly towards an operator holding the hoe by its handle and thereby allow the hoe to be drawn towards the operator with the tines embedded in the ground and allow the ground to be very easily broken up with a minimum amount of effort.

Another object of the invention is to provide the hoe with tines which may easily penetrate the ground and will have sufficient resiliency to prevent them from being bent or broken when working sun baked soil.

The invention is illustrated in the accompanying drawing, wherein,—

Figure 1 is a view showing the improved hoe in side elevation, a portion of the handle of the hoe being indicated by dotted lines.

Figure 2 is a top plan view of the improved hoe.

The garden hoe constituting the subject matter of this invention consists of a head having a cross bar 1 adapted to be connected with a handle 2 by a shank or other suitable handle engaging element 3 and carrying prongs or tines 4 and 5 which project forwardly from the cross bar 1. By referring to Figure 2, it will be seen that the tines are preferably formed by slitting the end portions of a metal bar from which the cross bar is formed, and then bending the slit ends to form end tines 4 and intermediate tines 5. The slit ends of the bar will of course be gradually reduced in thickness and rounded in cross section, but terminate at their extreme ends in enlarged heads 6 which taper to a penetrating point and are sharpened along their side edges.

The tines or prongs extend from the cross bar in converging relation to each other, as clearly shown in Figure 2, and are then bent downwardly and rearwardly, as shown in Figure 1, with their rearwardly extending portions diverging, as shown in Figure 2. By this arrangement, the prongs will have a diagonal motion through the soil when the hoe is grasped by its handle and drawn towards the operator. It should be further noted that the intermediate tines 5 are so bent that they are disposed in advance of the end tines 4 between the plane of the upper and lower portions of the end tines and their free ends project rearwardly beyond the free ends of the end tines. This is clearly shown in Figure 1, and by referring to this figure it will be seen that when the hoe is in use the tines 5 will move through the ground in a slightly higher plane than the tines 4, and thereby allow the tines to dig deeply into the ground and the hoe drawn longitudinally towards the operator with a minimum amount of effort. Therefore, the soil about growing plants or between rows of plants can be very easily broken up in order to allow air and moisture to penetrate the ground and cause the plants to grow efficiently. If desired, the horizontal planes in which the lower portions of the tines extend relative to each other may be varied and also the sharpened ends may be made smaller.

Having thus described the invention, I claim:

1. A garden implement comprising a head consisting of a bar split longitudinally from its ends and having its split end portions bent to form a cross bar and tines extending forwardly from the ends and intermediate portions of the cross bar, said tines being bent downwardly and rearwardly in spaced relation to their rear ends to provide rearwardly extending free end portions, the intermediate tines being bent downwardly in advance of the down turned portions of the end tines and having their rearwardly extending portions disposed in a higher plane than the rearwardly extending portions of the end tines and projecting rearwardly beyond the free ends thereof, and a shank extending from the cross bar intermediate its length for engagement with a handle.

2. A garden implement comprising a head having a cross bar, and tines extending forwardly from the ends and intermediate portions of said cross bar, said tines extending from the cross bar in converging relation to each other and being then bent downwardly and rearwardly in diverging relation to each other with the intermediate tines disposed in advance of the end tines and intermediate the planes of the upper and lower portions thereof.

In testimony whereof I affix my signature.

CHESTER A. MORGAN. [L. S.]